(12) United States Patent
Blersch

(10) Patent No.: US 6,795,308 B2
(45) Date of Patent: Sep. 21, 2004

(54) MOBILE COMPUTER SYSTEM, METHOD FOR OPERATING A MOBILE COMPUTER SYSTEM AND USE OF A MOBILE COMPUTER SYSTEM

(75) Inventor: Christian Blersch, Weichs (DE)

(73) Assignee: E.E.P.D. Electronic Equipment Produktion & Distribution GmbH, Weichs (DE)

( * ) Notice: Subject to any disclaimer, the term of this patent is extended or adjusted under 35 U.S.C. 154(b) by 0 days.

(21) Appl. No.: 10/305,204

(22) Filed: Nov. 26, 2002

(65) Prior Publication Data

US 2003/0142473 A1 Jul. 31, 2003

(30) Foreign Application Priority Data

Nov. 27, 2001 (DE) .......................................... 101 57 802

(51) Int. Cl.[7] ................................................. G06F 1/16
(52) U.S. Cl. ...................... 361/683; 361/686; 301/10.1; 454/184; 701/36
(58) Field of Search .......................... 361/683, 686–720; 307/9.1, 10.1; 165/80.3, 122–126; 701/36; 454/184; 312/236, 223.1, 223.2

(56) References Cited

U.S. PATENT DOCUMENTS

| | | | | |
|---|---|---|---|---|
| 5,794,164 A | * | 8/1998 | Beckert et al. ............ | 455/3.06 |
| 5,926,367 A | * | 7/1999 | Gutierrez et al. ........... | 361/695 |
| 5,999,952 A | * | 12/1999 | Jenkins et al. .............. | 708/100 |
| 6,236,918 B1 | * | 5/2001 | Sonoda et al. ............... | 701/36 |
| 6,472,771 B1 | * | 10/2002 | Frese et al. ................. | 307/10.1 |

* cited by examiner

Primary Examiner—Darren Schuberg
Assistant Examiner—Anthony Q. Edwards
(74) Attorney, Agent, or Firm—Pearne & Gordon LLP

(57) ABSTRACT

The invention relates to a mobile computer system (10*d*), a method for operation and a use of such a computer system.

Figure 1:
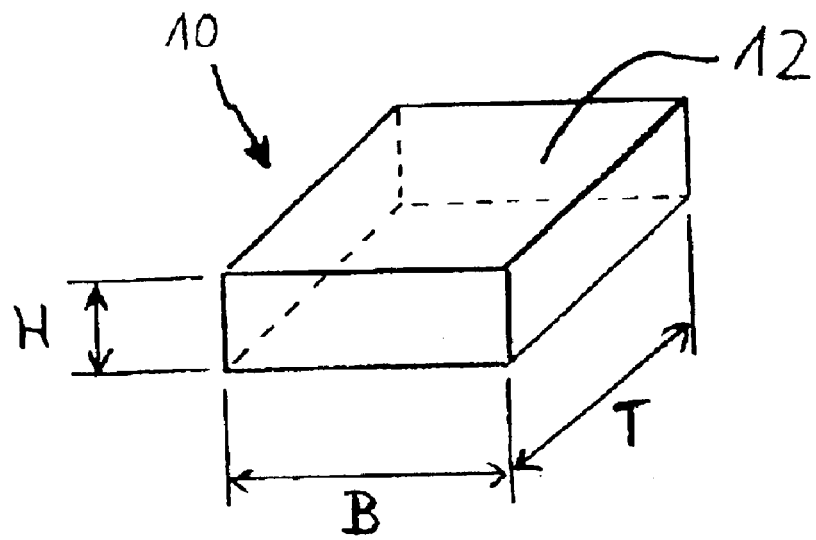

The invention provides new functionalities and fields of application for mobile computer systems by taking into account to a large extent the conditions typical of vehicles in the design of the computer system (10*d*), including the design of interface devices.

In one embodiment the computer system (10*d*) is accommodated in a casing which on account of its dimensions is suitable for building into a conventional car radio cavity of a vehicle (1*d*). Adapting to the vehicle conditions, further aspects of the invention relate to concepts for cooling of system components for compatibility with industrial standards, for protection of system components as well as other vehicle components from damage or destruction and for control of vehicle components.

12 Claims, 5 Drawing Sheets

MOBILE COMPUTER SYSTEM, METHOD FOR OPERATING A MOBILE COMPUTER SYSTEM AND USE OF A MOBILE COMPUTER SYSTEM

The invention relates to a mobile computer system, a method for operation and a use of such a computer system.

The term "computer system" used here especially comprises systems built of those computer components which are known from conventional personal computers (PCs) and operate according to commonly used standards. Merely as examples of such standard components or standards mention may be made of: central processing units in the form of a Pentium CPU (containing processor, co-processor, cache memory and cache controller on a single chip), bus systems in accordance with standards such as ISA, EISA, PCI, peripheral equipment such as hard disks, keyboards and displays with assigned controllers for connection to common bus systems or for connection via special adaptors (e.g. SCSI controllers) which in turn are to be connected to common bus systems, and interface devices connected via a bus (e.g. in accordance with the RS-232-C standard) etc.

Mobile computer systems are known, for example, as laptop computers or notebook computers. Although these computers can in principle be used in any location and especially in vehicles, these systems are in no way adapted to the conditions typical of vehicles, except for their handiness, so that their actual use in vehicles generally serves to deal with special tasks, for example, writing a text using a text processing program, sending a fax via a mobile telephone connected to the system or the operation of a GPS navigation system with the aid of a GPS receiver connected to the system. In such applications the mobile computer system is usually positioned on a passenger seat, for example, in the vehicle. Of the vehicle's own electrical or electronic components, usually only a power supply connection is used in this case. It is an object of the present invention to enlarge the usage and range of application of a mobile computer system in a vehicle and especially to facilitate or simplify the possibility of connecting the vehicle's own electrical or electronic components.

According to a first aspect of the invention, a mobile computer system having a casing is provided, which accommodates at least one central processing unit for processing digital data and a storage device for storing digital data, and having interface connections for input and/or output of digital data, wherein the casing has external dimensions such that the computer system is suitable for building into a cavity of a vehicle, provided for building in a car radio or the like. By this means the possibility is advantageously provided that the system can be built into a vehicle in a simple fashion and without special positioning expenditure. It should be noted here that the cavity provided for building in a car radio or the like is usually favourable both with respect to operation and also with respect to connection to the vehicle electrics or the vehicle electronics.

It is preferably provided that the casing is substantially rectangular and has external dimensions in the range of 170 mm to 190 mm in width, in the range of 40 mm to 60 mm in height and in the range of 160 mm to 180 mm in depth. With these dimensions, the system is especially well suited for installation in many types of vehicle, whether during the initial fitting or installed subsequently. In particular, it is advantageous if these dimensions are provided in conformance with DIN-ISO 7736.

A number of measures have proved especially advantageous for implementing such a small computer system nevertheless having a high capacity. For example, in order to save space inside the casing, it can be provided that a board substantially completely taking up the internal width and internal depth of the casing is provided in the casing near the upper side or the lower side of the casing. The terms "width", "height", "upper side", "lower side" etc. used here merely serve to define a "coordinate system" inherently fixed in the system, to which reference is made during the description of the invention. Naturally, spatial directions thus defined can change their roles depending on the mounting position of the system in a vehicle. The space saving associated with the arrangement of the board near the upper side or the lower side is further increased if this board carries a large proportion of the computer system components and the components carried by the board are substantially only mounted on one side. In any case, the board is then "near" the side of the casing if the clearance between the board and the casing side is a maximum of 20% of the corresponding internal dimension of the casing.

In a preferred embodiment a further board is arranged near the opposite lower side or upper side of the casing, which takes up a substantially smaller area and only carries components of a power supply for the system. Advantageously, there is provided in this power supply a device for converting a typical on-board voltage into normal supply voltages for personal computers. This further board is also preferably equipped on one side so that the equipped flat sides of the boards are facing one another. A substantial advantage of this arrangement is the possibility of simply providing a stream of cooling air which cools the component of both boards at the same time. Furthermore, with this arrangement components especially far from the particular board can be arranged in a spatially nested fashion (intermeshing in a comb-like fashion). If the further board is equipped on both sides, it is preferable if at least the power electronics components (not digital electronics), that is the components which generate a large amount of heat, are arranged facing the former board.

In a further development of the invention, the interface connections at a rear side of the casing are arranged in several planes, namely a principal plane near the plane of the board which carries the central processing unit and other essential system components for operation of the computer system, and at least one secondary plane at some distance from this, wherein in the principal plane there are arranged principal interfaces selected from the group consisting of a network connection (e.g. for connection of a laptop or another system according to the invention), a FireWire connection, a USB connection, a PS/2 connection, a serial interface connection, sound card connections and a display connection (especially VGA or DVI connection), whereas in the secondary plane or planes there are arranged secondary interfaces selected from the group consisting of game port connections, parallel interface connections and connections for external floppy disk or hard disk drives.

In a preferred embodiment, the system comprises an interface device together with an interface connection for input and/or output of digital data to a vehicle's own bus using a so-called CAN (Controller Area network) standard.

It is further advantageous if the central processing unit is thermally connected to the inside of the casing section via a heat-dissipating plate for removal of heat, and air cooling means are provided to produce a heat-dissipating air flow past the central processing unit, wherein the air cooling means transfers the air flow which has passed the central processing unit, subsequently along to the outside of this casing section. In this case, the central processing unit which is usually especially sensitive with respect to the ambient temperature is cooled to a certain extent both passively (by heat conduction e.g. in a copper plate) and also actively (by convection in an air flow), wherein the cooling air flow is further used for cooling that section of the casing which forms the heat sink of the passive cooling. The heat-dissipating plate is preferably bent into an L-shape, wherein flat sides at both ends of the plate are thermally coupled to the processing unit or the inside of the casing section via a heat-conducting paste. In order to carry out the passive cooling especially efficiently, the central processing unit is preferably arranged near the relevant section of the casing, especially with a clearance between the processing unit and the inside of the casing section of a maximum of 20% of the relevant internal dimension of the casing. It is especially suited for the afore-mentioned double (passive and active) cooling if an electric fan is arranged built into a side wall of the casing, which takes the air from the inside of the casing and emits this in a direction along the outside of this side wall.

In a further development of the invention, the mobile computer system comprises:

a primary bus connected to the central processing unit, and a first switching arrangement connected to the primary bus, hereinafter called the first bridge, for provision of a first secondary bus according to a first standard (preferably a PCI standard or a newer standard such as PC 104 plus), wherein computer system components according to the first standard and at least one plug connector are connected at the first secondary bus, wherein at the plug connector several connections not used according to the first standard are connected to signal leads of the system such that at the plug connector there are all the signals necessary for a second switching arrangement, hereinafter called the second bridge, for the provision of a second secondary bus according to a second standard (preferably an ISA standard) which differs from the first standard.

Computer systems with several secondary buses according to different standards and the necessary bridges e.g. in the form of chip sets, are inherently known. The connections not used according to the standard of the first secondary bus are also in fact not used in the prior art. The signals used according to the first standard are fed together with other signals via a fixed wiring of the motherboard of the second bridge so that this can provide the second secondary bus. The further signals are necessary for this. The arrangement described above, preferred in the framework of the invention, accordingly provides that all the signals necessary for the provision of the second secondary bus are thus already available at the connections of a plug connector of the first primary bus, and thus differs physically from the known systems. The decisive advantage of the innovation is that the mobile computer system offers the option of an extension without additional costs using a second bridge connected via the plug connector. The second bridge can, for example, be provided as a push-in card which is to be plugged in directly into the plug connector and, on the other hand, has plug connectors for the second secondary bus or can be connected to such plug connectors. In contrast, according to the prior art, only a non-extendable system with a single primary bus can be manufactured at the same cost or a previously extended system (with two or more secondary buses) can be manufactured.

According to a second aspect of the invention, a mobile computer system is provided, wherein sensor means are provided to detect ambient conditions of the computer system or the environment of components of the computer system as well as means of prohibition for limiting or preventing any operation of the computer system or any operation of components of the computer system, and wherein these sensor means and prohibition means are operated permanently in order to temporarily restrict or prevent the operation of the computer system or the operation of computer system components when predetermined ambient conditions exist. It is thus possible to adapt the operation of the system or individual system components to the changing ambient conditions in a vehicle and to carry out this operation safely for all system components. Under certain (impermissible) ambient conditions, operation or starting up a computer system component could lead to damage or even destruction thereof. The term "environment" covers in the broadest sense the spatial area whose temperature, vibrations etc., can adversely effect the functioning capability of the relevant system components or the system. This environment especially comprises the inside of a component. For example, if the temperature in the area of an LCD display or a hard disk is too high or too low when starting up these devices, this can lead to permanent damage. Such damage is reliably avoided by the above measure, wherein in addition to detecting the temperature, it is also advantageous to detect any moisture or, vibration or other ambient parameters. Hereby it is provided that operation of an affected system component is only limited or prevented as long as the impermissible ambient condition persists. This has the major advantage that when impermissible ambient conditions do not exist, the respective system components can be automatically re-activated. For example, a display connected to the computer system via an interface can be switched off as long as the temperature prevailing locally at the display is impermissible for this display. During a switch-off phase of a component, the system as such can continue to be operated as long as the switched-off component is not essential for operation of the system. If an essential component such as the central data processing unit is switched off, this leads to switching off the computer system as such. In this case, the system can advantageously also restart (boot) completely automatically as soon as permissible ambient conditions are detected for all essential components. In other words, the capacity of the computer system is optimally matched to the ambient conditions (which frequently change in a vehicle).

In a preferred embodiment the sensor means and prohibition means are jointly supplied by a permanent power supply which normally supplies all the computer system components and with the aid of the prohibition means is acted upon with suitable control signals to interrupt the power supply to the component or components concerned when impermissible ambient conditions exist. By means of this power supply the operation (switch off) of components can be prevented in a simple fashion. In order to limit the operation of a component, it can be provided that suitable control signals are supplied from the prohibition means to controllers of the component.

In a further development of the invention it is provided that at least one component of the computer system has a storage unit in which permissible operating conditions with respect to the environment of this component are permanently stored in the form of digital data and can be retrieved (preferably in a ROM, EPROM or EEPROM component). In this case the system component carries in it information on its permissible ambient conditions, wherein this information is usable as part of the invention in a simple fashion by retrieving digital data. It is thus, for example, easily possible to further ensure the safety and optimum matching of the computer system if a system component is exchanged for a component that is more or less sensitive with respect to an ambient parameter. Alternatively or additionally, for example, permissible temperature ranges can be stored in the BIOS component.

According to a further aspect a of the invention, especially in connection with the method last described for temporary limitation or prevention of the operation of the system or components thereof, there is provided a method for operation of a mobile computer system in a vehicle that is fitted with a plurality of electronic components as well as an air-conditioning device for local air conditioning of the vehicle, wherein temperatures and/or humidities in the environment of the electronic components are permanently detected and assessed in a programme-controlled fashion by means of the computer system to determine whether the ambient temperatures or humidities allow safe operation of the electronic components of the vehicle and wherein the environment of the electronic components is locally air-conditioned by means of the computer system in a program-controlled fashion as long as ambient temperatures or humidities assessed as critical exist. Important here is the detection and assessment of local parameters by means of the computer system and the control of a vehicle's own air-conditioning device for local air conditioning. The computer system therefore intervenes in a controlling fashion in the electronics of the vehicle in order to ensure its climate for reliable operation of the electronic components concerned.

If the components to be air-conditioned are connected to a vehicle's own CAN bus, the temperatures and/or humidities are preferably detected by means of sensors which are also connected to the CAN bus, and the computer system preferably has a CAN bus connection so that the detected data can be read in via this special interface in a simple fashion and can be processed. In the presence of a CAN bus, the air-conditioning device can generally also be controlled via this bus so that the computer system can then transmit control commands to control this air-conditioning device via the CAN bus.

According to a further aspect of the invention, the method last described can be generalised to a use of a mobile computer system in a vehicle for control of electronic components via a vehicle's own bus to which the computer system is connected. Especially intended here is the CAN bus frequently used in modern vehicles wherein these methods or uses can of course easily be transferred to future standards of such bus systems used to produce a reciprocal communication connection between individual vehicle components or a central vehicle electronic system (on-board computer). The computer system according to the invention can now additionally be connected to the vehicle's own bus in order to achieve new functionalities in a flexible fashion. It should be noted at this point that the connection to the vehicle bus generally already presents no problems because vehicles mostly have a suitable bus connection in the form of a plug connector which is hitherto only used for diagnostics purposes.

In one embodiment of the invention the computer system is used to detect conditions obtaining in the environment of the vehicle and for storage in the form of digital data in a storage device of the computer system, especially for video recording of an environment of the vehicle and storage of video data in the storage device. This use is interesting, for example, for monitoring the safety of money transportation vehicles. In this application, the storage can be accomplished in such a way that the stored data only represents a limited period of time whose beginning is a pre-determined time interval back, thus for example, only represents the last hour. In a further development it is provided that the detected data are evaluated in real time by means of the computer system in order to assess whether processes are taking place in the environment of the vehicle which are of relevance for the application concerned, e.g. should trigger a further notification. The video data can be evaluated using inherently known image analysis methods which can be carried out in a program-controlled fashion on the mobile computer. Alternatively, stored video data can be not evaluated in real time but (e.g. from time to time) can be transferred to a stationary computer (e.g. a mainframe computer) for evaluation.

In a further embodiment, the mobile computer system is used as an "electronic tachograph", that is for recording time-resolved vehicle data such as the speed but also the location (using GPS position determination) or other variables of state of individual vehicle components. In this way, the computer system can also be used as an accident detector (black box) wherein the digital data recorded directly before an accident can be used to reconstruct the accident. With reference to the possibility of an accident and especially when used as an accident detector, it is preferable if the digital data are recorded on a storage medium which is not sensitive to vibrations during operation, especially a so-called memory card (flash card). Such storage media are available with capacities of 3 GB or more so that video recording of an appreciable time interval can thus be made. Finally, in a further embodiment the use of the computer system for controlling "entertainment components" of the vehicle via the vehicle's own bus is provided. The control of a television receiver may be mentioned here as an example. Alternatively, entertainment functions can be provided by the mobile computer system itself. For example, fully functional television receivers or car radios can be provided in the form of computer system components whose output means (display, loudspeaker etc.) can also be realised by corresponding system components, wherein especially a display as well as a sound card with connected loudspeakers can be used as part of the invention for quite different functionalities, for example, for navigation, for television reception and for video games.

Figure 2:
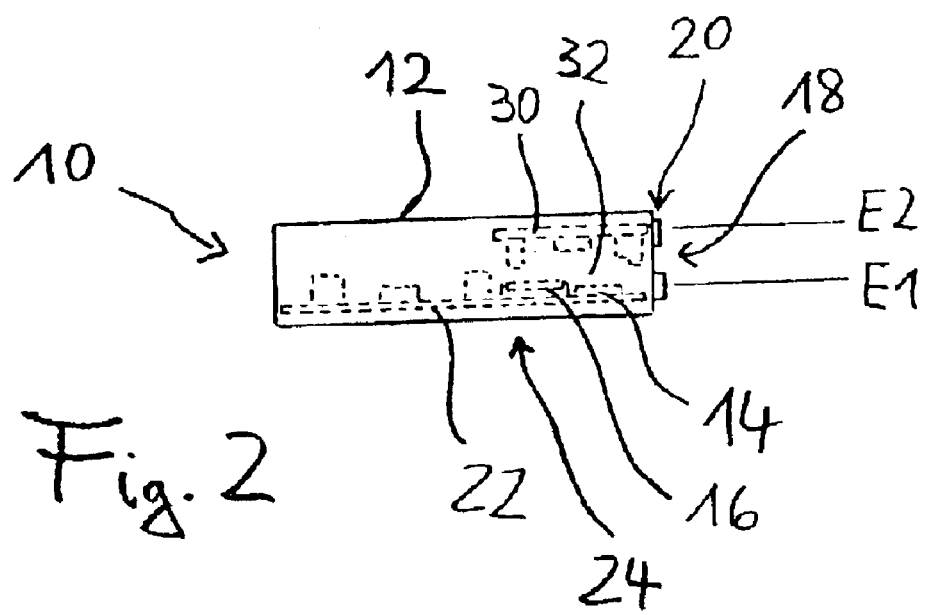
Figure 3:
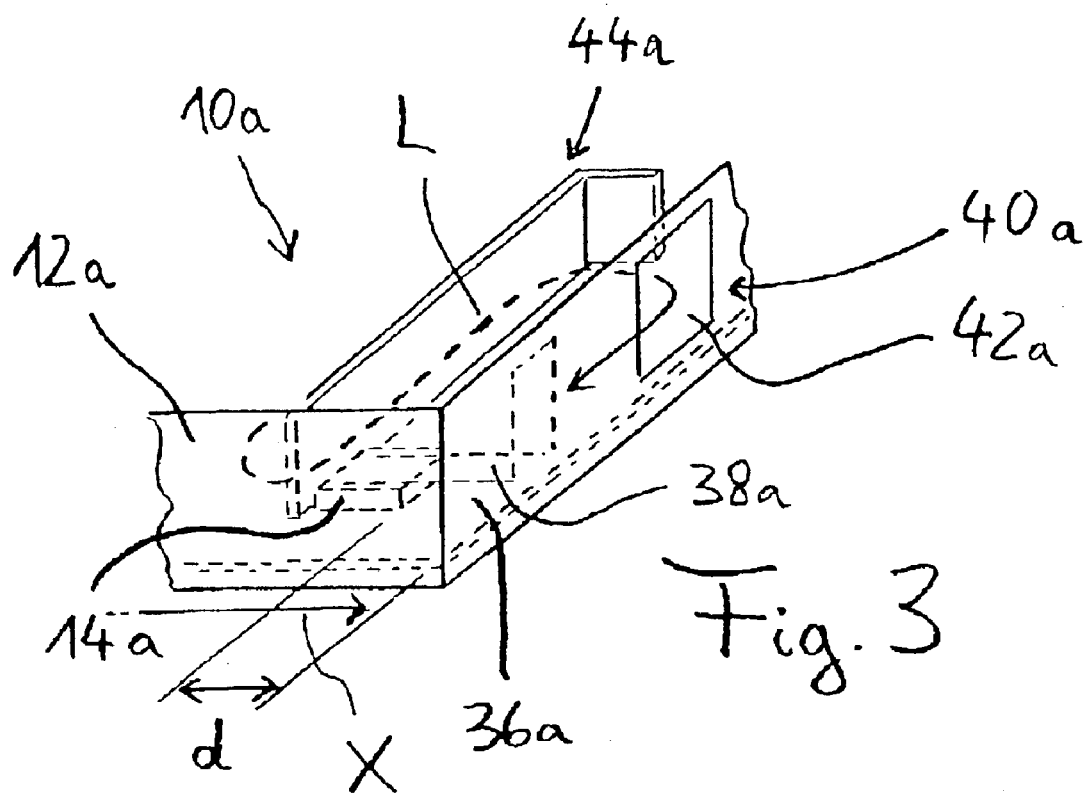
Figure 4:
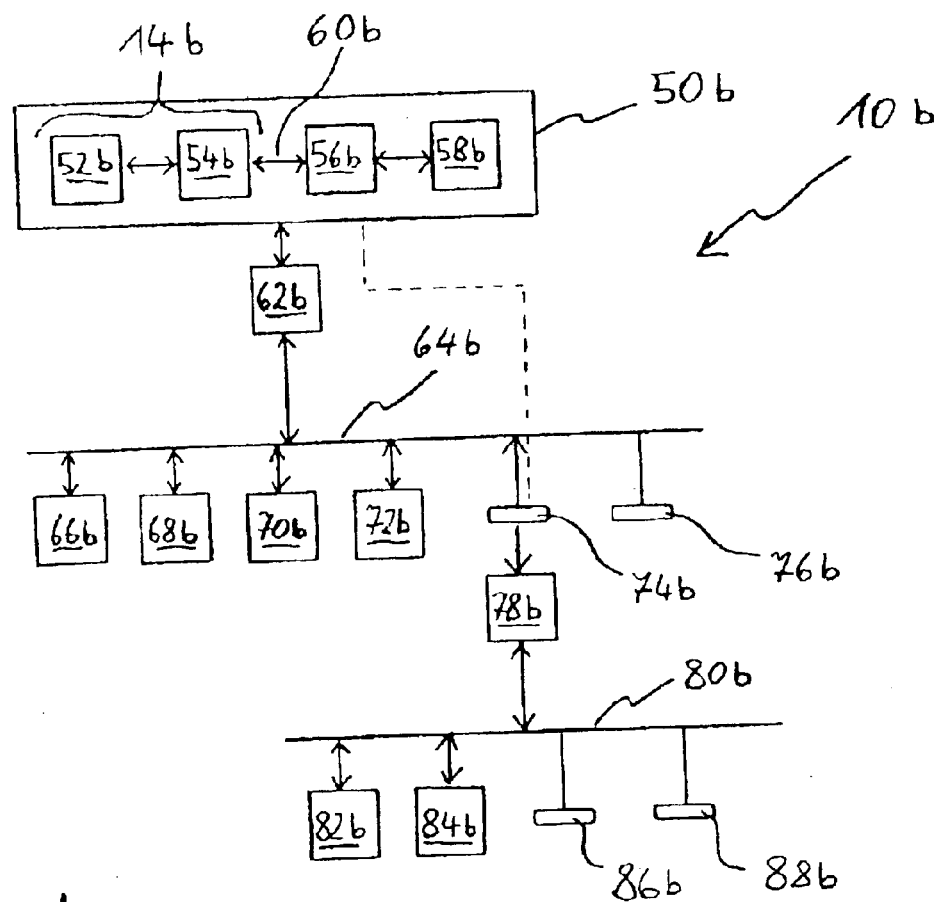
Figure 5:
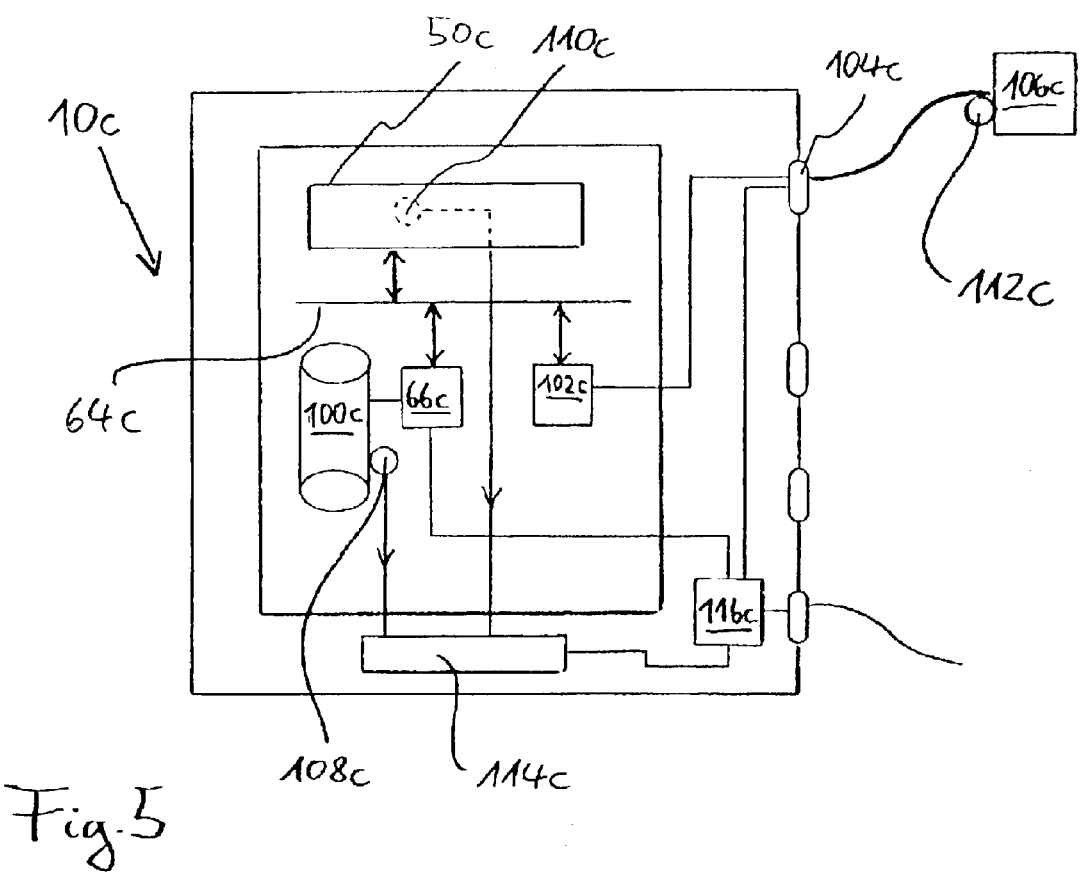
Figure 6:
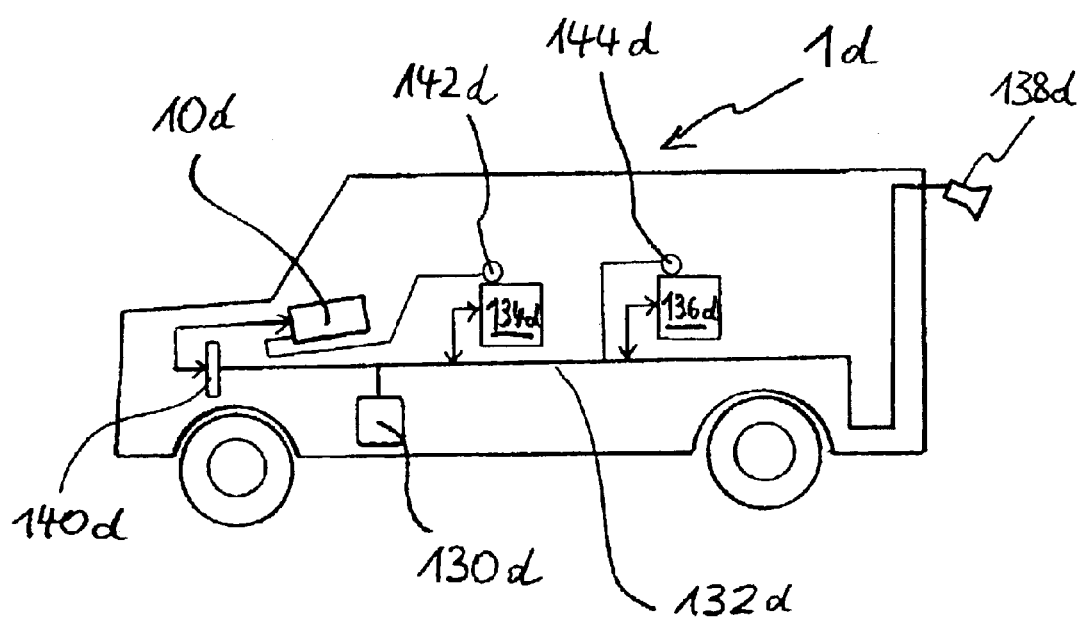

The invention is explained subsequently in detail using embodiments with reference to the appended drawings wherein:

FIG. 1 is a schematic view of a casing of a mobile computer system,

FIG. 2 is a schematic view of an arrangement of a mother board and a power supply board in the casing according to FIG. 1, FIG. 3 is a schematic view of a cooling arrangement for cooling a CPU, FIG. 4 is a schematic view of an arrangement of components for implementing an extension bus (ISA) in addition to a standard bus (PCI), FIG. 5 is a schematic view of system components to show the method for protection of individual system components or the entire system in the presence of impermissible temperatures, vibrations etc, and FIG. 6 is a schematic diagram showing a use of a mobile system for controlling a vehicle's own air-conditioning device to specifically air-condition individual vehicle components.

FIG. 1 shows a mobile computer system 10 with an approximately rectangular casing 12 which accommodates all the essential computer system components for operation of the system 10.

The casing has external dimensions of approximately 180 mm×50 mm×170 mm (width×height×depth). In the figure the width, height and depth are denoted by B, H and T. With these dimensions the system 10 is well suited for building into a cavity of a vehicle (e.g. private car, lorry) which is usually used for building in a car radio.

FIG. 2 shows a central processing unit 14 in the form of a CPU unit for processing digital data as well as a storage unit 16 in the form of a so-called flash card which forms part of the complete storage devices of the computer system 10. If such a memory card is inserted into a plug socket arranged on the board, the edge of the memory card facing the socket is preferably secured by means of an adjacent section of the casing 10 to prevent the card from falling out of the socket. In order that the card can then be easily exchanged, it is preferable in this case if the casing 10 consists of at least two interconnectable casing sections so that the securing casing section can be removed from the edge of the card. Rows of interface connections 20 for input or output of digital data can also be seen in a plurality of planes, here two planes E1 and E2 at a rear side 18 of the casing 12. The CPU 14, storage unit 16 and further system components are arranged on a principal board (motherboard) 22. This board 22 substantially completely takes up the internal width and depth of the casing 10 (format: 164 mm×160 mm) and is arranged near a lower side 24 of the casing 12, wherein the principal board 22 is equipped on one side (top). In FIG. 2 a smaller board 30 can also be seen, which takes up less than ¼ of the base area defined by the width and depth of the casing 10 and is also equipped on one side with downward-pointing power supply components. The downward-pointing components in each case comprise all the power electronics components (which produce a comparatively large amount of heat). In this arrangement an intermediate space 32 formed between the boards 22 and 30 can advantageously be acted upon by a common cooling air flow so that the parts of the system components facing one another can be cooled by this common cooling air flow.

The interface connecting plane E1 is arranged approximately at the height of the motherboard 22 and comprises a principal plane for the arrangement of certain principal interface connections. The principal interfaces especially comprise the connections particularly important for applications in the vehicle described later as well as connections for data transmission with especially high data transmission rates. In contrast, less important or slower interfaces are provided in the interface plane or planes (E2).

In the following description of further embodiments similar components are denoted by the same reference numbers, supplemented by a small letter to distinguish the particular embodiment. If features and modes of operation of components have already been described, this description is largely dispensed with in the description of subsequent embodiments and reference is hereby made expressly to the previous description. Features described for the individual embodiments or combinations of features can easily be combined almost arbitrarily one with the other.

FIG. 3 shows a section of a mobile computer system 10*a* with a casing 12*a*. A CPU 14*a* is arranged at a distance d of approximately 10% of the corresponding interior area dimension X from the inside of a casing section 36*a* and is thermally connected to the inside of the casing section 36*a* via a heat-dissipating plate 38*a* to remove heat. This passive cooling is supported by active cooling in the form of a cooling air flow L, which sweeps among others over the CPU 14*a*, and is passed via a fan 42*a* built into a side wall 40*a*, from the inside of the casing, deflected by 90° and directed along the outside of this side wall 40*a* such that the air flow directed along the outside sweeps over the casing section 36*a*. By this means very efficient double cooling is provided with an extremely small space requirement. A further improvement of this cooling concept is achieved if the side wall has outwardly projecting cooling fins or is structured to form such cooling fins. In this way, the side wall can be better cooled, the fan better integrated and the exhaust air can be fed better along the side wall (fins in the direction of the exhaust air flow).

A further contribution to the cooling efficiency is made if air-conducting walls 44*a* are arranged vertically inside the casing as shown in FIG. 3.

FIG. 4 shows the implementation of a favourably priced mobile computer system with a PCI bus and the option for extension with an ISA bus. The representation is limited to the computer system components especially important for this aspect.

A processor-main memory system 50*b* comprises a coprocessor 52*b* and a main processor 54*b* which together form a central processing unit 14*b*. As further components, the system 50*b* also comprises a cache memory 56*b* as well as a main memory 58*b* which are connected one to the other and with the processing unit 14*b* and communicate in a conventional fashion by a primary bus 60*b* ("CPU/host interface").

The system 50*b* is connected to a PCI-bus 64*b* via a conventional PCI bridge 62*b* so that conventional computer system components (shown at 66*b* to 72*b*) such as drives, interface devices, sound cards etc. can also communicate with the processor-main memory system 50*b*. FIG. 4 also shows two plug connectors 74*b* and 76*b* connected to the PCI bus 64*b* for connection of still further optional PCI system components.

A particular feature of the computer system 10*b* shown is that at least at one of the plug connectors 74*b*, 76*b* connections (pins) are contacted which are designated as "not used" according to the PCI standard used. These additional connections guide derived signals (shown dashed in FIG. 4) out of the area of the processor-main memory system 50*b* which, together with the signals otherwise used in any case according to the PCI standard, allow an extension bus interface to be operated. The additional connection contacting of the plug connector or connectors concerned (here: 74*b*) means almost no additional expenditure during manufacture of the computer system 10*b* but provides the option of a subsequent integration of an extension interface 78*b* by connection to a "PCI" plug connector, e.g by direct insertion of a PCI/ISA bridge card into the plug connector 74*b* constructed as a socket.

The lower part of FIG. 4 shows this extension to an ISA bus 80*b* which is then again available for connection of ISA system components 82*b*, 84*b* as well as further ISA components by means of plug connectors 86*b*, 88*b*.

FIG. 5 shows a mobile computer system 10 with a processor-main memory system 50*c* to which a secondary bus 64*c* is attached to integrate various system components, such as, for example, a hard disk controller 66*c* for a hard disk 100*c* and a graphics card 102*c* which is connected on the output side to an interface socket 104*c* to operate an image output device, here an LCD display 106*c*.

Temperatures at the hard disk 100*c*, inside the CPU of the system 50*c* as well as at the LCD display 106*c* are detected by sensors 108*c*, 110*c* and 112*c* and transmitted to evaluation electronics 114*c*. The evaluation electronics 114*c* is permanently supplied with power from a power supply unit 116c and permanently monitors the physical parameters detected via the connected sensors. The aim of this detection and evaluation is to temporarily stop individual components or the entire system 10c in the presence of certain conditions in the environment of the individual system components or in the environment of the system 10c. The presence of vibrations or shocks can especially be established during the monitoring of conditions at a hard disk.

In order to achieve reliable and fast switching off of system components, it is provided in the embodiment shown that the evaluation electronics 114c if necessary gives commands to the power generating unit 116c and on the basis of these commands, this unit 116c temporarily interrupts the power supply provided in the normal case, namely for as long as the conditions for the component concerned are impermissible.

Unlike the example shown, in one variant the function of the evaluation electronics 114a is implemented at least partly by a suitable program sequence in a BIOS memory of the system 10c. In this way, for example, during starting of the system 10c, at the BIOS level it can first be checked which of the system components can be operated on the basis of the currently prevailing conditions and which cannot. Then, measures can be taken in the further course of the start-up process to limit or prevent the operation of individual components, for example, by corresponding commands to allocated controllers or also by commands to a common power supply unit or a micro-controller allocated to the power supply. Alternatively or additionally, this implementation of monitoring by means of the BIOS can also be provided for the state following starting of the system 110c.

Depending on the specific implementation, it is especially advantageous if the components automatically start up again after the impermissible conditions have disappeared so that the performance of the system 10c is optimally matched to the frequently changing conditions in mobile use.

The sensors can both be arranged as additional equipment on conventional computer system components or sensors already located in conventional components can also be used. The CPU temperature sensor 110c is, for example, already built into conventional processor chips.

In a preferred embodiment in which at least one sensor is provided to detect any vibration, an actual degree of vibration is determined by the evaluation electronics 114c (or the BIOS) and compared with a component-specific limiting value. The component is then switched off if the limiting value is exceeded and then switched on again if the degree of vibration lies continuously below the limiting value for a pre-determined time. For motor vehicles, for example, a time of a few seconds to a few minutes is suitable as the predetermined time.

FIG. 6 shows the connection of a mobile computer system 10d to a central control unit 130d of a motor vehicle 1d. The control unit 130d communicates via a CAN bus 132d with various electronic vehicle components of which only an air-conditioning device 134d, a display terminal 136 and a video camera 138c are shown in FIG. 6. Integration of the mobile computer system 10d for the purpose of providing functionalities not provided by the central vehicle control unit 130c takes place in a simple fashion here by connecting the system 10d to a CAN bus socket 140d provided for diagnostic purposes. If the vehicle's own electronic components are not themselves provided with sensors to detect ambient parameters such as temperature, vibration etc., such sensors (as indicated at 142d and 144d) can be arranged at these electronic components. Thus, for example, it is possible to extend the method described above for protection of components of the mobile computer system alternatively or additionally to components of the vehicle. In the specific case shown this means that the display of the display terminal 136d remains switched off as long as the temperature at the display is not within the range specified as permissible by the display manufacturer. The system 10d (without the display) can continue to be operated in this case.

A further feature of the computer system usage according to FIG. 6 is that local climate data in the vehicle can be evaluated by the computer system 10d wherein, if this is indicated by the evaluation, the environment of the vehicle components is air-conditioned as long as climate data to be assessed as critical are established. In the embodiment shown, this measure has the result, for example, that the times during which the display terminal 136d cannot be operated are shortened by the active air-conditioning.

To sum up, the invention makes it possible to have new functionalities and fields of application for mobile computer systems by taking into account to a large extent vehicle-specific conditions in the design of the computer system including the design of interface devices.

What is claimed is:

1. A mobile computer system having a casing (12) which accommodates at least one central processing unit (14) for processing digital data as well as a storage device (16, 56, 58) for storage of digital data, and having interface connections (20) for input and/or output of digital data, wherein the casing (12) has external dimensions (B, H, T) such that the computer system is suitable for building into a cavity of a vehicle (1) provided for building-in a car radio or the like, wherein the central processing unit (14) is arranged at a distance but thermally connected to the inner side of a casing section (36) via a heat-dissipating plate (38) to remove heat and air cooling means (42, 44, 40) are provided to produce a heat-dissipating air flow (L) past the central processing unit (14) and wherein the air cooling means (42, 44, 40) transfers the air flow after this has passed over the central processing unit along the outside of this casing section (36), and wherein the air cooling means comprise an electric fan (42) built in a side wall (40) of the casing, which takes air from the inside of the casing and emits it in a direction alona the outside of this side wall (40).

2. The computer system according to claim 1 wherein the casing (12) is substantially rectangular and has external dimensions (B, H, T) in the range of 175 mm to 185 mm in width, 45 mm to 55 mm in height and 165 mm to 175 mm in depth.

3. The computer system according to claim 1, wherein a board (22) substantially completely taking up the internal width and internal depth of the casing is arranged inside the casing (12) near the upper side or the lower side of the casing.

4. The computer system according to claim 1, wherein the central processing unit (14) is arranged in the vicinity of the casing section (36).

5. The mobile computer system according to claim 1, comprising
a primary bus (60) connected to the central processing unit (14), and
a first bridge (62) connected to the primary bus (60) for the provision of a first secondary bus (64) according to a first standard, wherein at the first secondary bus (64) computer system components (66–72) according to the first standard and at least one plug connector (74) are connected, wherein at the plug connector (74) several connections not used according to the first standard are connected to signal leads of the computer system such that at the plug connector (74) there are all the signals required for a second bridge (78) for provision of a second secondary bus (80) according to a second standard which differs from the first standard and the mobile computer system offers the option of an extension using such second bridge (78) connected via the plug connector (74).

6. The computer system according to claim 5, wherein the first standard is a PCI standard and the second standard is an ISA standard.

7. A mobile computer system, especially according to claim 1, wherein sensor means (108–112) to detect the ambient conditions of the computer system or the environment of components of the computer system as well as prohibition means (114, 116) for limiting or preventing any operation of the computer system or any operation of components of the computer system are provided, and wherein these sensor means and prohibition means are operated permanently in order to temporarily limit or prevent the operation of the computer system or the operation of the computer system components in the presence of pre-determined ambient conditions in which an ogeration otherwise could lead to damace of the system or the components, respectively.

8. The computer system according to claim 7 wherein sensor means (108–112) are designed to detect at least one temperature and/a humidity and/or vibration.

9. The computer system according to claim 7, wherein at least one component of the computer system has a storage unit in which permissible operating conditions with respect to the environment of this component are stored permanently in the form of digital data and can be retrieved.

10. A method for operation of a mobile computer system (10), especially for operation of a mobile computer system according to claim 1, wherein ambient conditions of the computer system or the environment of components of the computer system are permanently detected, wherein the detected conditions are permanently evaluated in order to assess whether the conditions permit safe operation of the computer system or safe operation of components of the computer system without a risk for damage due to operation, and wherein the operation of the computer system or the operation of computer system components is limited or prevented as long as ambient conditions assessed as impermissible exist.

11. A method for operation of a mobile computer system (10), especially according to claim 10, in a vehicle (1) that is equipped with a plurality of electronic components (136, 138) outside the mobile comDuter system (10) and a vehicle air-conditioning device (134) for local air-conditioning of the vehicle (1), wherein temperatures and/or humidities are permanently detected in the environment of the electronic components and are evaluated in a program-controlled fashion by means of the computer system (10) to assess whether the ambient temperatures or humidities allow safe operation of the electronic components of the vehicle (1) and wherein the environment of the electronic components is locally air-conditioned in a program-controlled fashion by means of the vehicle air-conditioning device (134) controlled by the computer system (10), as long as ambient temperatures or humidities assessed as critical exist.

12. Use of a mobile computer system (10) according to claim 1, in a vehicle (1)
  for control of electronic components via a vehicle's own bus (132) to which the computer system (10) is connected and/or
  for detection of conditions present in the environment of the vehicle (1) and storage in the form of digital data in a storage unit of the computer system, especially for video recording of an environment of the vehicle (1) and storage of video data in the storage device.

* * * * *

UNITED STATES PATENT AND TRADEMARK OFFICE
CERTIFICATE OF CORRECTION

PATENT NO. : 6,795,308 B2
DATED : September 21, 2004
INVENTOR(S) : Christian Blersch It is certified that error appears in the above-identified patent and that said Letters Patent is hereby corrected as shown below:

Column 10,
Line 40, after "unit" please insert -- , --.
Line 43, please delete "alona" and insert therefor -- along --.

Column 11,
Line 25, please delete "ogeration" and insert therefor -- operation --.
Line 26, please delete "damace" and insert therefor -- damage --.
Line 28, after "claim 7" please insert -- , --.
Line 29, before "sensor" please insert -- the --.
Line 30, please delete "and/a" and insert therefor -- and/or --.

Column 12,
Line 14, please delete "comDuter" and insert therefor -- computer --.
Line 28, after "claim 1" please delete ",".

Signed and Sealed this

Ninth Day of August, 2005

JON W. DUDAS
*Director of the United States Patent and Trademark Office*